Figure 1:
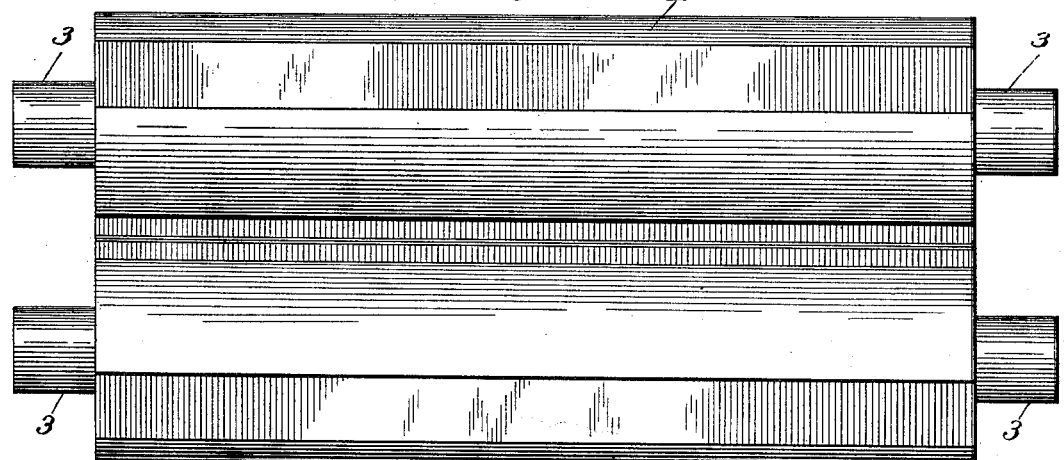

No. 736,478. PATENTED AUG. 18, 1903.
B. R. BENJAMIN.
SNAPPING ROLLS FOR CORN HARVESTING OR HUSKING MACHINES.
APPLICATION FILED SEPT. 18, 1902.
NO MODEL. 2 SHEETS—SHEET 1.

Witnesses:
Chas. J. O'Neill
W. Beatle Williams Jr.

Inventor:
Bert R. Benjamin
by Ennie & Goldsborough
Attys.

No. 736,478. Patented August 18, 1903.

UNITED STATES PATENT OFFICE.

BERT R. BENJAMIN, OF CHICAGO, ILLINOIS, ASSIGNOR TO INTERNATIONAL HARVESTER COMPANY, OF CHICAGO, ILLINOIS, A CORPORATION OF NEW JERSEY.

SNAPPING-ROLLS FOR CORN HARVESTING OR HUSKING MACHINES.

SPECIFICATION forming part of Letters Patent No. 736,478, dated August 18, 1903.

Application filed September 18, 1902. Serial No. 123,892. (No model.)

*To all whom it may concern:*

Be it known that I, BERT R. BENJAMIN, a citizen of the United States, residing at 1193 Millard avenue, city of Chicago, State of Illinois, have invented certain new and useful Improvements in Snapping-Rolls for Corn Harvesting or Husking Machines; and I do hereby declare the following to be a full, clear, and exact description of the invention, such as will enable others skilled in the art to which it appertains to make and use the same.

The invention relates to snapping-rolls for corn harvesting and husking machines wherein the stalks are fed endwise or edgewise, or substantially so, between the rolls and have their ears snapped off, the stalks passing on between the rolls and the ears either being delivered to other rolls where they are husked or in an unhusked condition to any convenient receptacle.

The object of the invention is to produce a pair of snapping-rolls the bite or aggressive action of which on the ears may be adjusted or regulated to accommodate the varying conditions of the feed and the differences in the size of the stalks and the ears themselves. Heretofore these snapping-rolls have usually been constructed with longitudinal ribs separated by grooves or spaces, the ribs and intermediate spaces being of uniform cross-section, and the rolls have been geared together by gears of uniform size; but no adjustment of the gearing was contemplated, and when once the relation between the rolls was determined there was no object in adjusting their relative positions, because of the fact that the ribs or spaces on the rolls were all of the same size. The aggressiveness of the rolls was therefore not adjustable, and the ears were not infrequently dragged between the rolls and the butts badly crushed or mutilated by the ribs before the ears were snapped off. To obviate these difficulties and insure an adjustable and regulable feed which may be adapted for all conditions of work and to effect a positive snapping off of the ears of varying sizes without injury to the body of the corn, I construct my snapping-rolls with two or more pairs of longitudinal notches in their peripheries, the individual notches of each pair being preferably disposed on diametrically opposite sides of the rolls. These rolls are geared together so as to revolve in opposite directions and at a uniform rate of speed, as usual; but the gears are made adjustable with respect to each other, so that the rolls may be peripherally adjusted to cause the notches of one roll to register and coöperate with any desired notches of the opposite roll. The surfaces between the notches preserve the cylindrical contour of the rolls, thereby affording the further advantage of always presenting an inclined or rounded surface to the ears which are to be snapped from the stalks, thus preventing the butts of the ears from being crushed or mutilated.

The invention is illustrated in the accompanying drawings, in which—

Figure 2:
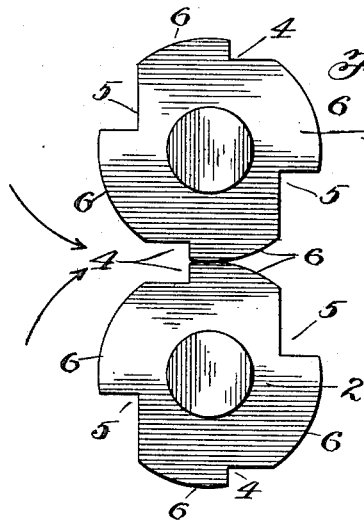
Figure 3:
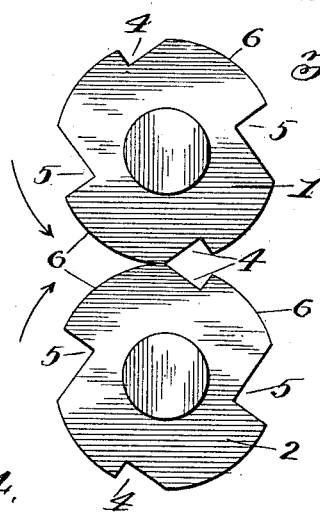
Figure 4:
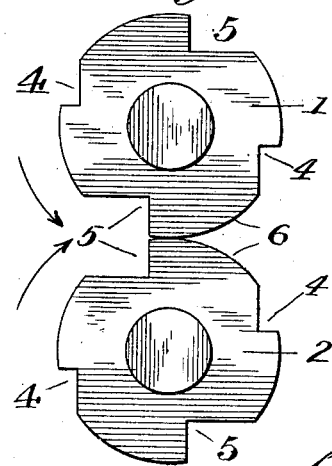
Figure 5:
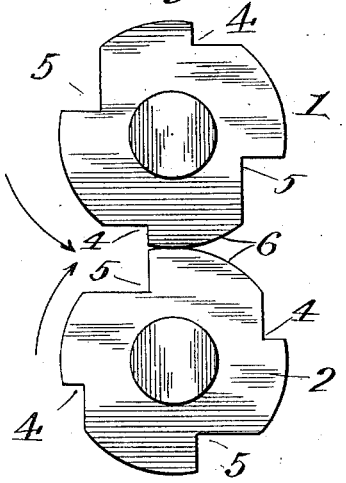
Figure 6:
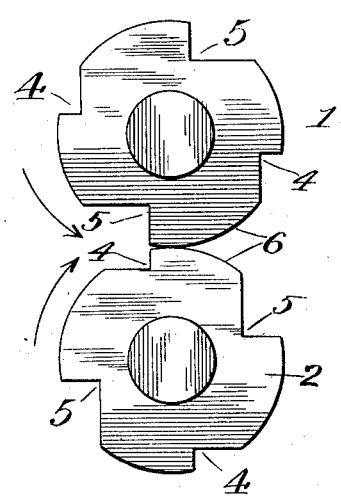
Figure 7:
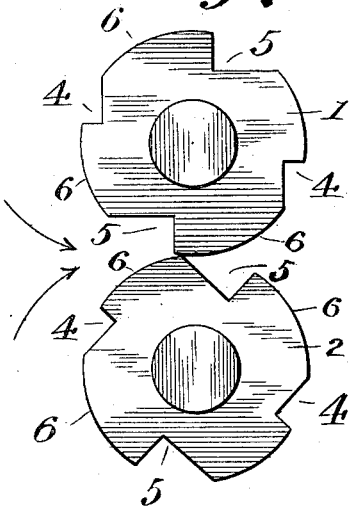
Figure 8:
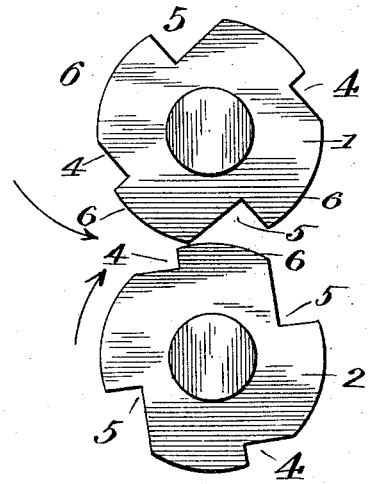

Figure 1 is a side elevation of a pair of rolls. Fig. 2 is an end elevation of a pair of rolls, showing the registration of the smaller notches. Fig. 3 is a view corresponding to Fig. 2, but showing the rolls revolved a little further to show the action of the rounded surfaces on the butt of the ear to be snapped off. Fig. 4 is a view similar to Fig. 2, but showing the rolls revolved still further to bring the larger notches into registration. Figs. 5 and 6 are end elevations showing the adjustment of the rolls in which the smaller notch is brought into registration with a larger one, making the rolls less aggressive. Figs. 7 and 8 are end elevations of the rolls, showing an adjustment in which none of the notches register, but each notch is brought adjacent to a rounded surface on the adjacent roll, making the rolls still less aggresive, but still presenting to the butt of the ear an inclined or rounded surface on each roll.

Referring to the drawings, the numerals 1 and 2 represent contiguous parallel rolls which are adapted to be rotated upon journals 3 3, projecting from their opposite ends, which journals are mounted in suitable bearings in the frame of the machine in such relation as to dispose the rolls in the rear of a feed-chute, into which the stalks are fed endwise by the operator in a manner well understood in this class of machines. The rolls are driven in opposite directions, as indicated by the arrows, by suitable gearing, so that as the stalks are passed between them the ears are caught by their stems adjacent to the butts and snapped off. Each roll is constructed with two or more pairs of longitudinal notches in their peripheries, the notches of each pair preferably being disposed on diametrically opposite sides of the roll. Each pair of notches varies in size from the other pairs, and in the form illustrated there are shown two pairs of notches 4 4 and 5 5 on each roll, each notch comprising a rectangular kerf running the entire length of the roll, the notches 4 4 being of less depth than the notches 5 5. Between the respective notches the cylindrical contour of the roll is preserved, as indicated at 6 6, so that as the surfaces roll together the butt of an ear is presented between the two converging inclined or rounded surfaces, which react against the butt and eject the ears from between the rolls as soon as the stem is severed. It is to be particularly noted that when the larger notches register the bite of the approaching edges is sharper, as the throat formed between the two notches is quite amplified. Hence the rolls are most aggressive, in that they quickly engage the stem of the ear and draw the butt into engagement with the rounded surfaces 6 6 and the ear is quickly snapped off. This arrangement is desirable where the feed is rapid or where the ears are large. Under conditions which require a slower feed when the stalks are light and the ears are small it is necessary to make the rolls less aggressive by decreasing the throat-opening between the registering notches. This is accomplished by bringing the smaller notches 4 of one roll—as, for instance, the upper roll 1 of Fig. 5—into registry with the larger notches 5 of roll 2, which may readily be accomplished by adjusting the gearing, which drives the rolls in opposite directions and at a uniform speed. Should it be found necessary to still further reduce the aggressiveness of the rolls, the gearing is so adjusted as to drive them so that the notches of one roll register with the curved surfaces of the other, as shown in Figs. 7 and 8. It is also to be noted that whatever the relation of the rolls may be in the matter of aggressiveness the rounded or inclined surfaces of both rolls are always presented to the butt of the ear which is to be snapped from the stalk, thereby forcing the ear away from the rolls and preventing the end or butt from being chewed or mutilated.

Having thus described my invention, what I claim is—

1. A pair of snapping-rolls for corn husking or harvesting machines, each roll having a plurality of pairs of longitudinal notches of different sizes, and the individual notches of each pair being at diametrically opposite points on the rolls.

2. A pair of snapping-rolls for corn harvesting or husking machines, each roll having longitudinal notches of different sizes, and the surfaces of the rolls between the notches being rounded so as to preserve the general contour of the rolls.

3. A pair of snapping-rolls, for corn harvesting or husking machines, each roll having longitudinal notches of different sizes, and the rolls being adjustable with respect to each other, so as to cause notches of one size on one roll to register and coöperate with notches of the same or a different size on the other roll.

4. A pair of snapping-rolls for corn husking or harvesting machines, each roll having longitudinal notches differing from one another in size, the notches of one roll corresponding in number and size with the notches of the other roll, and the rolls being adjustable with respect to each other so as to cause the notches of one size on one roll to register and coöperate with those of the same or a different size on the other roll.

In testimony whereof I affix my signature in presence of two witnesses.

BERT R. BENJAMIN.

Witnesses:
CHAS. N. CHAMBERS,
W. M. TWOMBLY.